Oct. 11, 1955 C. A. OTTO 2,720,218
FLUID PRESSURE OPERATED DAMPERS OF THE DUAL TYPE
Original Filed March 29, 1951
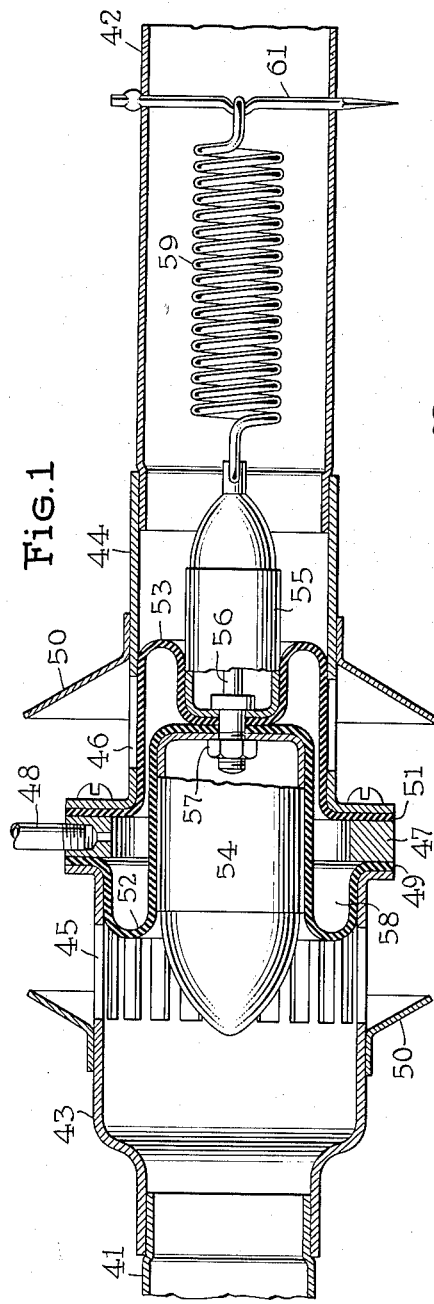
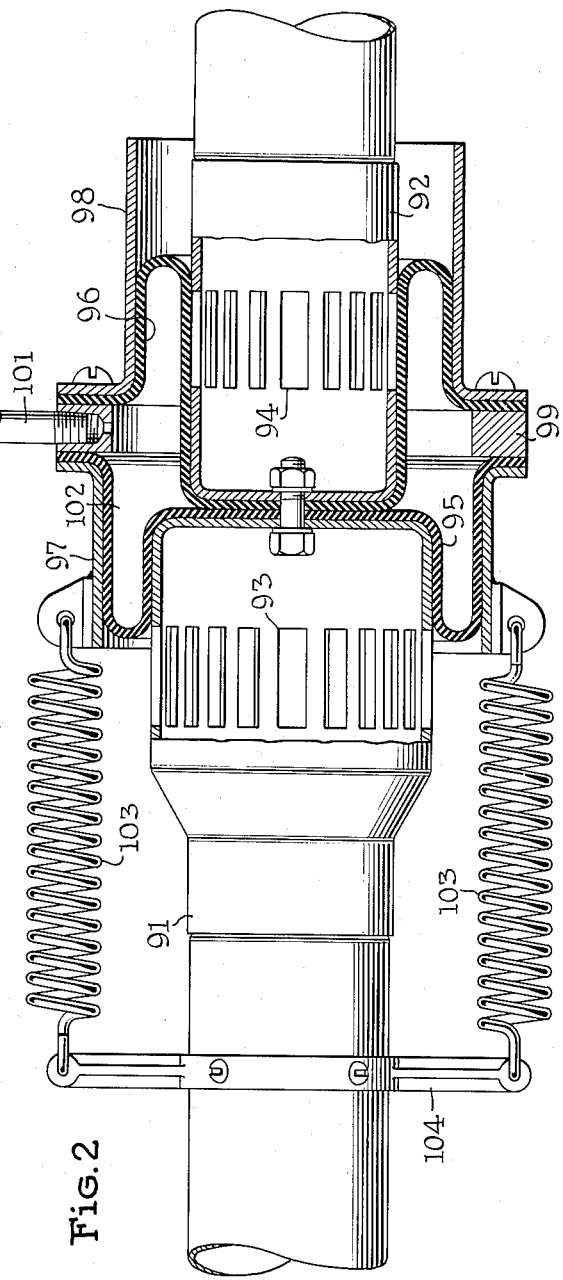
INVENTOR
Carl A. Otto
BY
ATTORNEYS

United States Patent Office 2,720,218
Patented Oct. 11, 1955

2,720,218

FLUID PRESSURE OPERATED DAMPERS OF THE DUAL TYPE

Carl A. Otto, Milwaukee, Wis., assignor to Johnson Service Company, Milwaukee, Wis., a corporation of Wisconsin Original application March 29, 1951, Serial No. 218,140. Divided and this application December 7, 1953, Serial No. 397,290

2 Claims. (Cl. 137—595)

This invention relates to pressure-motor-operated dampers, and can be embodied in single dampers and in dual or mixing dampers. The present application is restricted to dual dampers, and is a division of application Serial No. 218,140 filed March 29, 1951, from which applicant was required to remove claims directed to dual dampers. One outstanding advantage of the invention is the ease with which the damper can be designed to afford special flow-rate characteristics by changing the contour of the ports.

Important space economies are made possible by the fact that the motor and damper are combined in a single moving part which is short and can be mounted within the duct or an extension thereof.

Two typical embodiments will now be described by reference to the accompanying drawings, in which:

Fig. 1 is an axial section of two axially alined ducts with a duplex damper and differential actuating motor interposed between the proximate ends of the ducts.

Fig. 2 is a similar section showing a modified type of duplex damper in which the motor includes a sleeve which encircles the ends of the ducts and shifts in the direction of its axis.

It is characteristic of the invention that a tubular rubber-like sleeve folded through itself rolls between two coaxial cylindrical surfaces to function simultaneously (1) as a rolling seal between two relatively movable parts of an expansible chamber motor and (2) as a valve which obstructs or exposes progressively ports formed in one of the cylindrical surfaces. In this way the motor and the damper are a single unit and occupy little more space than that necessary for the motor alone. The whole thing can be housed in a prolongation of the duct with which it is associated.

A dual damper constructed according to the invention controls flow to or from two axially alined ducts and is interposed between the proximate ends of the ducts. This pre-supposes two sets of ports, one set for each duct, and two rolling sleeves each controlling the ports of a corresponding duct. Since there need be only one motor, the two seals formed by the sleeves are associated with opposite ends of a differential motor of the expansible chamber type. Such a motor is single acting and consequently biasing means, usually of the spring type, are used.

Fig. 1 shows an embodiment in which the moving parts are within the dimensional limits of the ducts and are enclosed.

A familiar field of use is to control simultaneously in inverse senses the flow of two media to a mixing chamber. For convenience in discussion the fluids will be called warm air and cold air.

Assume that 41 is a warm air duct and 42 the cold air duct. They lead to two flanged valve bodies 43 and 44 each with an annular series of slot ports 45 and 46. Conical deflectors 50 may be mounted adjacent ports 45 and 46, as shown, to cause local mixing of the issuing streams of air. Between the flanges of the bodies 43 and 44 are assembled a spacer ring 47 with branch line 48 and the peripheral flanges 49 and 51 of two rolling seal members 52, 53.

The branch line 48 leads from any appropriate pressure-regulating device, and could be branch line of pneumatic thermostat.

The rolling sleeve members 52 and 53 are cup-like members of rubber or similar resilient impervious material, preferably devoid of fabric or other reinforcements. The rolling folds of these members are oppositely arranged as shown.

Associated with members 52, 53 are cylindrical sustaining members 54, 55 of different diameters, assembled end to end and clamped upon central portions of members 52, 53 by a stud 56 and nut 57. The members 43 and 44 are in effect the cylinder of an expansible chamber motor, and the members 54 and 55 the piston of that motor. Pressure developed in motor space 58 by the admission and exhaust of pressure fluid through branch line 48 will urge the members 54, 55 to the left. To oppose this action a coiled tension spring 59 is used. It is connected at one end to member 55 and at the other end to the cross-pin 61.

The relative diameters of parts 44 and 55 and of 43 and 54 and the thicknesses of members 52 and 53 are so coordinated that the rolling folds center the parts 56 and 54, afford rolling seals between the relatively moving parts and act progressively to obstruct and expose the ports 46 and 45. The parts 52 and 53 are so dimensioned and the ports 45, 46 so located that closing of ports 45 proceeds as opening of ports 46 takes place and vice versa. The shape and dimension of the ports 45, 46 can be chosen to afford desired flow characteristics, as already explained.

In some cases it is desirable to have the moving parts and the seals external to the duct. Fig. 2 shows an arrangement of this type.

The two valve bodies 91 and 92 have ports 93 and 94. Their ends are closed and clamp between them the two rolling seals 95 and 96. The ducts are of different diameters and are encircled by sleeves 97, 98 (also of unequal diameters) which shift together and outwardly confine the rolling seals 95, 96. The sleeves 97, 98 have flanged ends connected to spacer ring 99 and serving to clamp to it the marginal flanges of the seals 95, 96. The sleeves 97, 98 constitute the cylinder of an expansible chamber motor, and the valve bodies 91, 92 constitute the piston of that motor.

The flexible branch line 101 leads to the motor chamber 102. Two biasing springs 103 are used and react between assembly 97, 98, 99, and a fixed yoke 104. The valve action is the same as that described for Fig. 2, one set of ports starting to open as the other starts to close.

The concept can be variously embodied and has the advantage of compactness, silence of action, large port area, absence of mechanism interposed between the motor and the valve or valves and above all low internal friction, so that its response is subject to minimum practicable lag.

I claim:

1. A combined mixing valve and pressure-motor comprising in combination, two axially alined connected tubular members, each having an annular series of ports; means obstructing communication between said tubular members; a generally cylindrical member coaxial with said members and movable axially relatively thereto, said cylindrical member being so differentiated in diameter from the two tubular members as to afford substantial annular clearance between each tubular member and the cylindrical member; two rolling seals each bridging a corresponding one of said annular clearances, and each comprising tubing of rubber-like material turned through itself to afford a rolling fold which yieldingly reacts radially on the cylindrical member and on the corresponding tubular member, to which respectively the tubing is sealed at opposite sides of the fold, said rolling seals defining between them a differential motor space whose volume varies as a consequence of said axial motion, the parts being so dimensioned and arranged that said axial motion causes said rolling seals progressively to expose one and progressively to cover the other series of ports; means for admitting and exhausting pressure fluid to and from said motor space; and yielding means for biasing the parts in opposition to forces developed by pressure in said motor space.

2. The combination of two couples each comprising two coaxial members, namely a piston and an encircling cylinder so differentiated in diameter as to afford an intervening annular clearance, said members being movable relatively to one another in the direction of their common axis, one of the members of each couple having an annular series of ports, the piston members of the two couples being connected to move in unison relatively to said cylinder members and being characterized by unequal diameters and the cylinder members of the two couples being connected to move in unison relatively to said piston members and being characterized by similarly unequal diameters; two rolling seals one bridging each of said annular clearances, both seals being located intermediate said series of ports and each seal comprising a tube folded through itself and adapted to roll into and out of obstructive relation with a corresponding one of said two series of ports; means for admitting and exhausting motive fluid to the space within said cylinders between the two seals; and yielding means reacting on said couples to oppose the action of said motive fluid.

References Cited in the file of this patent

UNITED STATES PATENTS

| | | |
|---|---|---|
| 1,851,062 | Protzer | Mar. 29, 1932 |
| 2,209,844 | Otto | July 30, 1940 |
| 2,343,584 | Scheele | Mar. 4, 1944 |